(12) United States Patent
Kondo

(10) Patent No.: US 8,793,609 B2
(45) Date of Patent: Jul. 29, 2014

(54) CONTROLLER AND PROGRAM OF THE CONTROLLER

(71) Applicant: Onkyo Corporation, Osaka (JP)

(72) Inventor: Yusuke Kondo, Osaka (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 13/676,614

(22) Filed: Nov. 14, 2012

(65) Prior Publication Data

US 2013/0205249 A1    Aug. 8, 2013

(30) Foreign Application Priority Data

Feb. 6, 2012   (JP) .................................. 2012-23260

(51) Int. Cl.
*G06F 3/048* (2013.01)

(52) U.S. Cl.
USPC .......................................................... 715/784

(58) Field of Classification Search
USPC ........................................................ 715/784
See application file for complete search history.

(56) References Cited

U.S. PATENT DOCUMENTS

| | | | | |
|---|---|---|---|---|
| 6,640,238 | B1 * | 10/2003 | Bowman-Amuah | 709/201 |
| 7,174,274 | B2 * | 2/2007 | Carlson et al. | 702/186 |
| 7,426,696 | B1 * | 9/2008 | Hwang et al. | 715/784 |
| 8,108,489 | B2 * | 1/2012 | Ihara et al. | 709/219 |
| 8,639,917 | B1 * | 1/2014 | Ben-Shaul et al. | 713/2 |
| 2001/0005850 | A1 | 6/2001 | Graham et al. | |
| 2002/0161818 | A1 * | 10/2002 | Watakabe et al. | 709/107 |
| 2002/0178453 | A1 * | 11/2002 | Jun et al. | 725/88 |
| 2004/0203959 | A1 * | 10/2004 | Coombes | 455/466 |
| 2005/0027673 | A1 * | 2/2005 | Moritani et al. | 707/1 |
| 2005/0193010 | A1 * | 9/2005 | DeShan et al. | 707/104.1 |
| 2005/0203991 | A1 * | 9/2005 | Kawamura et al. | 709/203 |
| 2005/0235136 | A1 * | 10/2005 | Barsotti et al. | 713/1 |
| 2007/0211066 | A1 * | 9/2007 | Kanda | 345/531 |
| 2007/0250877 | A1 * | 10/2007 | Ozaki | 725/89 |
| 2008/0071832 | A1 * | 3/2008 | Sugiura et al. | 707/104.1 |
| 2008/0077637 | A9 * | 3/2008 | Villers | 707/205 |
| 2009/0199117 | A1 * | 8/2009 | Yamamoto et al. | 715/764 |
| 2009/0319490 | A1 * | 12/2009 | Otsu et al. | 707/3 |

(Continued)

FOREIGN PATENT DOCUMENTS

WO   2008/114525 A1   9/2008

OTHER PUBLICATIONS

Debique et al., "Universal Plug and Play", UPNP Forum, No. Version 1.01, Jun. 25, 2002, XP000962393.

(Continued)

*Primary Examiner* — Ryan Pitaro
*Assistant Examiner* — Mary Dixon
(74) *Attorney, Agent, or Firm* — Renner, Otto, Boisselle & Sklar, LLP

(57) ABSTRACT

A controller for obtaining a contents list via a network, in which a contents list of scroll destination is quickly obtained when a scroll instruction is input, is provided. When the scroll instruction in the contents list is input by a user's operation, the controller sets a scroll list obtaining flag into an on state, and preferentially obtains contents information about the scroll destination. When the scroll list obtaining flag is set into the on state, the controller does not transmit a normal contents list obtaining request to a contents list transmitting apparatus. Since the controller transmits the normal contents list obtaining request after average response time passes, the controller can obtain the contents information about scroll destination in the contents list without delay.

6 Claims, 16 Drawing Sheets

(56) References Cited

U.S. PATENT DOCUMENTS

| | | | |
|---|---|---|---|
| 2010/0107175 A1 | 4/2010 | Abe et al. | |
| 2010/0182909 A1* | 7/2010 | Sagara et al. | 370/235 |
| 2010/0293064 A1* | 11/2010 | Gentry et al. | 705/16 |
| 2011/0055350 A1* | 3/2011 | Wyld | 709/217 |
| 2011/0258575 A1* | 10/2011 | Cupp et al. | 715/784 |
| 2012/0143729 A1* | 6/2012 | Qureshey et al. | 705/27.1 |
| 2012/0185749 A1* | 7/2012 | Okada et al. | 714/758 |
| 2013/0073601 A1* | 3/2013 | Jenkins et al. | 709/201 |

OTHER PUBLICATIONS

Extended European Search Report for corresponding patent application No. 13153782.1 dated Feb. 5, 2014.

* cited by examiner

Fig. 3

| serial number | musical composition ID | artist name | album name | track name | track reproducing time | obtainment flag |
|---|---|---|---|---|---|---|
| 1 | 12453 | Artist A | AlbumA1 | Track1 | 3:23 | TRUE |
| 2 | 12049 | Artist A | AlbumA1 | Track2 | 2:21 | TRUE |
| 3 | 32019 | Artist A | AlbumA1 | Track3 | 5:00 | TRUE |
| 4 | 49583 | Artist A | AlbumA1 | Track4 | 3:33 | TRUE |
| 5 | 49012 | Artist A | AlbumA2 | Track5 | 4:32 | TRUE |
| 6 | 99823 | Artist A | AlbumA2 | Track6 | 6:21 | TRUE |
| ... | ... | ... | ... | ... | ... | ... |
| 200 |  |  |  |  |  | TRUE |
| 201 |  |  |  |  |  | FALSE |
| 202 |  |  |  |  |  | FALSE |
| ... |  |  |  |  |  |  | contents list 12A

Fig. 9 average response time information 12B

| average response time | total request frequency | total time |
|---|---|---|
| 2.5sec | 1200 times | 3000sec |

Fig. 14 scroll operation interval value table 12D

| average scroll operating interval | total operrating frequency | total time |
|---|---|---|
| 2.5sec | 200 times | 500sec |

CONTROLLER AND PROGRAM OF THE CONTROLLER

BACKGROUND OF THE INVENTION

1. Field of the Invention

The present invention relates to a controller for obtaining information from another device.

2. Description of the Related Art

Home networks are provided with reproducing systems that are composed of a server for saving contents (music, video, or photograph), a reproducing apparatus (hereinafter, referred to as the AV receiver) for reproducing contents in the server, and a controller for obtaining and displaying a contents list from the server and instructing the AV receiver to reproduce the contents selected from the contents list by means of a user's operation. The controllers are, for example, smartphones or portable music players or the like.

Servers store a lot of contents. The controllers request servers to transmit contents information about a predetermined number (for example, 10) of contents (hereinafter, referred to as a normal contents list obtaining request). The controllers transmit a request for obtaining contents information to the servers until contents information about all contents in the contents list is completely obtained. For example, when a server has a contents list including 200 tunes, a controller transmits a command for obtaining contents information to the server twenty times so as to obtain all contents information. When an instruction for scrolling the contents list is input by a user's operation, the controller preferentially obtains the contents information of scroll destination even during the obtainment of the contents list, and should display it on a display section of the controller.

Conventionally, when the controller transmits the request for obtaining the contents information to the server, the controller adds priority relating to the obtainment of contents information to the server. The server executes a process based on the request transmitted from the controller according to the priority, and transmits the contents information to the controller. However, when requests from the controller are accumulated in the server, it takes a time to check the priority, and thus a response to the controller is delayed. Further, when an interrupt process such as scrolling is generated in the controller, even if the controller requests contents information about the scroll destination (hereinafter, referred to as a scroll list) from the server, the server cannot immediately transmit the scroll list to the controller while executing a process for obtaining the contents information transmitted from the controller in the past. As a result, display of the scroll list in the controller is delayed.

Gazette No. WO2008/114525 describes information processing apparatus that can efficiently control an application program group structured on OS without using a round-robin function or a TSS control function.

SUMMARY OF THE INVENTION

The present invention is devised in order to solve the above conventional problem, and its object is to provide a controller for obtaining a contents list in which when a scroll instruction is input, a contents list of scroll destination can be quickly obtained.

A controller according to a preferred embodiment of the present invention connectable to a contents list transmitting apparatus for transmitting a contents list, comprises: an obtainment determining section for determining whether obtainment of contents information in the contents list is finished; a contents information obtaining section for transmitting a normal contents list obtaining request that is a request for obtaining a predetermined number of the contents information of the contents whose contents information in the contents list is determined that the obtainment is not finished to the contents list transmitting apparatus so as to obtain the contents information; an average response time storage section for storing average response time as an average value of time from transmission of the normal contents list obtaining request to the contents list transmitting apparatus through completion of reception of the contents information; a scroll operation input section into which a scroll instruction of the contents list is input by a user's operation, a scroll list obtainment setting section for, when the scroll instruction is input, the obtainment determining section determines whether the obtainment of the contents information in the contents list of scroll destination is completed and determines that the information is not completely obtained, setting the contents information about the scroll destination into an on-obtaining state; and a scroll list obtainment determining section for determining whether the scroll list is being obtained, wherein when the determination is made that the scroll list is being obtained, the normal contents list obtaining request is not transmitted, and the contents information obtaining section transmits the request for obtaining the contents information about the scroll destination to the contents list transmitting apparatus, after the contents information obtaining section transmits the request for obtaining the contents information about the scroll destination to the contents list transmitting apparatus, the normal contents list obtaining request is transmitted after the average response time passes.

The controller can be connected to a contents list transmitting apparatus for transmitting a contents list. The controller transmits a normal contents list obtaining request as a request for obtaining information about contents in the contents list, and obtains contents information from the contents list transmitting apparatus. Further, the controller obtains an average response time as an average value of time from the transmission of the normal contents list obtaining request to the contents list transmitting apparatus through the reception of the contents information from the contents list transmitting apparatus. When a contents list scrolling instruction is input by a user's operation, the controller sets a scroll list obtaining flag to ON, and preferentially obtains the contents information about scroll destination. When the scroll list obtaining flag is set to ON, after the average response time passes, the controller transmits the normal contents list obtaining request. For this reason, the contents information about the contents list of the scroll destination can be obtained without delay.

In a preferred embodiment, after the contents information obtaining section obtains the contents information about the scroll destination, the scroll list obtainment setting section sets the scroll list into a non-obtaining state, after the scroll list is set into the non-obtaining state, the contents information obtaining section transmits the normal contents list obtaining request to the contents list transmitting apparatus.

When the controller obtains the contents information about the scroll destination, it sets the scroll list obtaining flag to ON. When the scroll list obtaining flag is set to ON, the controller does not transmit the normal contents list obtaining request to the contents list transmitting apparatus. For this reason, the contents list of the scroll destination can be obtained without delay.

In an another preferred embodiment of the present invention, when the average response time passes after the contents information obtaining section transmits the normal contents list obtaining request to the contents list transmitting apparatus, a determination is made whether the scroll list is being obtained, when the determination is made that the scroll list is being obtained, a process for obtaining the contents information in the normal contents list from the contents list transmitting apparatus is suspended, and the contents information obtaining section transmits the request for obtaining the contents information about the scroll destination to the contents list transmitting apparatus.

After the controller transmits the normal contents list obtaining request to the contents list transmitting apparatus, when the average response time passes, the controller determines whether the scroll list obtaining flag is set to ON. When the determination is made that the scroll list obtaining flag is set to ON, the controller obtains the contents information about the scroll destination. When the average response time passes, the controller can obtain the contents list about the scroll destination even while transmitting the normal contents list obtaining request.

The controller according to an another preferred embodiment of the present invention, further comprises: a scroll instruction interval obtaining section for obtaining a scroll instructing interval that is an average value of time from the input of the scroll instruction by means of the user's operation through next input of the scroll instruction, wherein when the determination is made that the scroll instructing interval is the average response time or less, the contents information obtaining section transmits the request for obtaining the contents information in the normal contents list whose number is smaller than the predetermined number to the contents list transmitting apparatus in the normal contents list obtaining request.

The controller obtains a scroll instructing interval as an average value of intervals at which the scroll instruction is input by a user's operation. When the controller transmits the normal contents list obtaining request, the controller requests contents information about a less number of contents from the contents list transmitting apparatus so that the obtainment of the normal contents is completed within time not more than the average scroll instructing interval.

The controller according to an another preferred embodiment of the present invention, further comprises: a scroll instruction interval obtaining section for obtaining a scroll instructing interval that is an average value of time from the input of the scroll instruction by means of the user's operation through next input of the scroll instruction, wherein when the determination is made that the scroll instructing interval is the average response time or less, the contents information obtaining section does not transmit the normal contents list obtaining request to the contents list transmitting apparatus, and waits for input of the scroll instruction until time of the scroll instructing interval or more passes.

When the determination is made that the scroll instructing interval is not more than the average response time, the controller does not transmit the normal contents list obtaining request to the contents list transmitting apparatus, but waits for input of the scroll instruction. The controller can prevent the input of the scroll instruction during the obtainment of the normal contents list and the obtainment of the contents information about the scroll destination from being delayed.

The controller for obtaining a contents list via a network or the like from the contents list transmitting apparatus, in which when the scroll instruction is input, a contents list of scroll destination can be quickly obtained, can be provided.

BRIEF DESCRIPTION OF THE DRAWINGS

FIG. 3 illustrates a contents list;

FIG. 9 illustrates average response time information;

FIG. 14 illustrates a scroll operation interval value table;

DETAILED DESCRIPTION OF THE PREFERRED EMBODIMENTS

A controller according to preferred embodiments of the present invention will be concretely described below with reference to the drawings, but the present invention is not limited to the embodiments.

Figure 1:
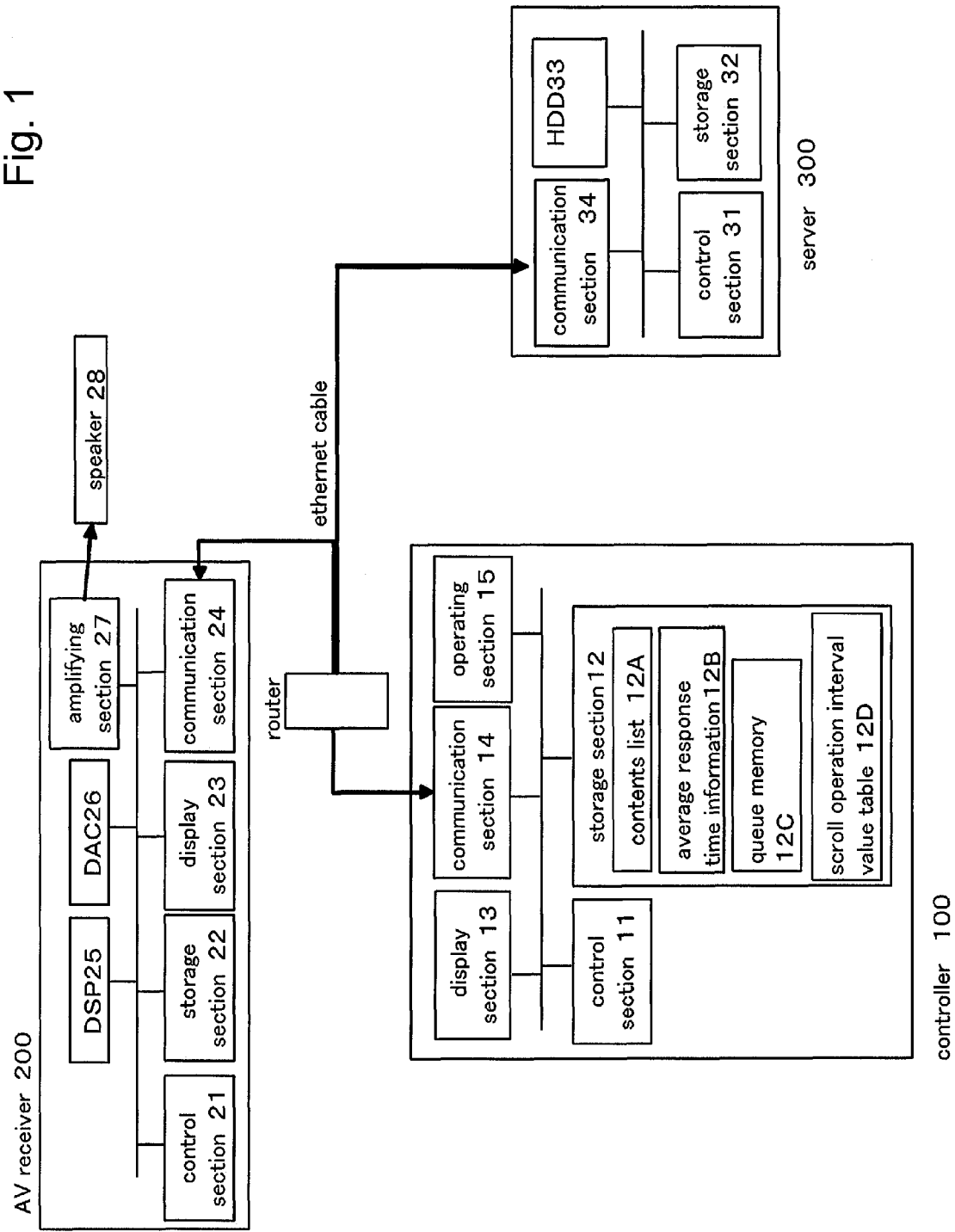
FIG. 1 is a block diagram according to preferred embodiments of the present invention.

FIG. 1 is a block diagram illustrating the controller, an AV receiver and a server according to the preferred embodiments of the present invention.

A controller 100 has a control section 11, a storage section 12, a display section 13, a communication section and an operating section 15. The control section 11 entirely controls the controller 100 according to execution of a program stored in the storage section 12. The control section 11 is, for example, a microcomputer or a CPU. The storage section 12 retains setting contents of the controller 100. The storage section 12 is, for example, a ROM or a RAM. The storage section 12 has a contents list 12A, average response time information 12B, a queue memory 12C and a scroll operation interval value table 12D, described later. The display section 13 displays a contents list transmitted from an AV receiver 200, for example. The display section 13 is, for example, a liquid crystal display or an organic EL display. The communication section 14 is a network interface that is connected to LAN or the like and communicates with another device (for example, the AV receiver 200). The operating section 15 is an interface for receiving user's operations. The operating section 15 is, for example, buttons or a touch panel provided in the controller 100. When the scroll instruction is input by a user's operation of the operating section 15, the control section 11 scrolls the contents list.

The AV receiver 200 has a control section 21, a storage section 22, a display section 23, a communication section 24, a DSP 25, a DAC 26 and an amplifying section 27. The control section 21 executes a program stored in the storage section 22 so as to entirely control the AV receiver 200. The control section 21 is, for example, a microcomputer or a CPU. The storage section 22 retains setting contents of the AV receiver 200 and contents list information or the like. The storage section 22 is, for example, a ROM or a RAM. The display section 23 displays selector information and a volume value or the like of the AV receiver 200. The display section 23 is, for example, an FL display, or a liquid crystal display or the like. The communication section 24 is a network interface that is connected to an LAN or the like, and communicates with another device (for example, the controller 100).

The DSP 25 executes a sound field process or the like on digital audio data. The DAC 26 is a digital-analog converting section, and converts digital audio data into analog audio data. The amplifying section 27 is an amplifier, and amplifies the audio data converted into an analog signal by the DAC 26 so as to output it to a speaker 28.

A server 300 has a control section 31, a storage section 32, an HDD 33 and a communication section 34. The control section 31 executes a program stored in the storage section 32 so as to entirely control the server 300. The control section 31 is, for example, a microcomputer or a CPU. The storage section 32 retains setting contents and contents list information or the like of the server 300. The storage section 32 is, for example, a ROM or a RAM. The HDD 33 is a hard disc drive, and stores contents. The contents list information may be saved in the storage section 32 or in the HDD 33. The communication section 34 is an interface that is connected to an LAN or the like and communicates with another device. The communication section 14, the communication section 24 and the communication section 34 may be communicated with each other by wireless or wire, or may be communicated by a communication method other than a network. The communication method other than a network is communication such as communication using an HDMI cable or communication using RS232C.

The control section 11 of the controller 100 having the above constitution requests the AV receiver 200 to transmit information about a contents list obtained from the server 300. The control section 11 obtains contents lists retained in the AV receiver 200 sequentially beginning from a head of the contents lists. When the control section 11 receives the scroll instruction of the contents list by means of a user's operation, it preferentially obtains a scroll list. When the control section 11 receives the scroll instruction in the contents list by means of the user's operation and is obtaining a normal contents list, the control section 11 temporarily stores contents numbers in the normal contents list being obtained into the storage section 12, and after finishing obtaining the list, restarts to obtain the normal contents list. To obtain the normal contents list means that the controller 100 obtains the list from the AV receiver 200 according to the sequence of the contents lists.

Figure 2:
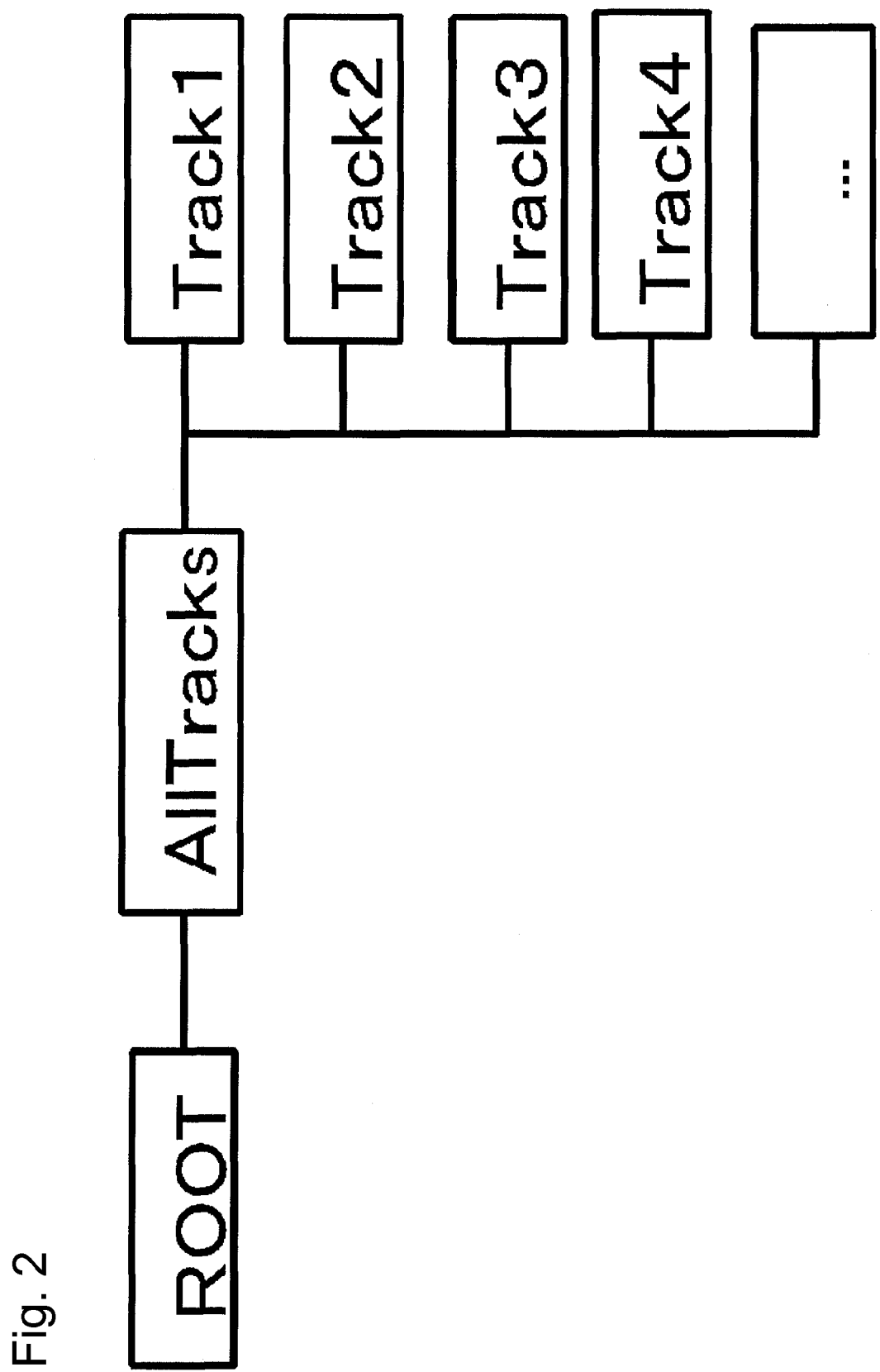
FIG. 2 is a conceptual diagram of a contents list according to the preferred embodiments of the present invention.

FIG. 2 is a conceptual diagram illustrating a hierarchical structure of the contents list in the AV receiver 200. A Root hierarchy, an AllTracks hierarchy and a Track hierarchy are present in this order beginning at the top. An Artist list hierarchy, an album list hierarchy and a track list hierarchy may be present below the Root hierarchy, or the list may have another hierarchical structure. In this embodiment, the controller 100 obtains the contents information from the AV receiver 200, but may obtain it from the server 300. The contents information is an artist name and an album name of a track, a track name, track reproducing time and the like.

FIG. 3 illustrates a contents list 12A in the storage section 12 of the controller 100, and the contents list 12A manages a track list present below the AllTracks hierarchy. The contents list 12A in FIG. 3 manages a serial number, musical composition ID, artist name, album name, track name, track reproducing time, and obtainment flag. "The track" represents musical composition itself, "contents" are general names of musical compositions, photographs, moving images. The serial number is a serial number of tracks at the lower hierarchy of the AllTracks, and the musical composition ID is an ID for uniquely specifying a track. The artist name and the album name indicate an artist name and an album name of each track. The obtainment flag is a flag representing whether the controller 100 completely obtains contents information about a track from the AV receiver 200, and its initial value is FALSE (non-obtained).

Figure 4:
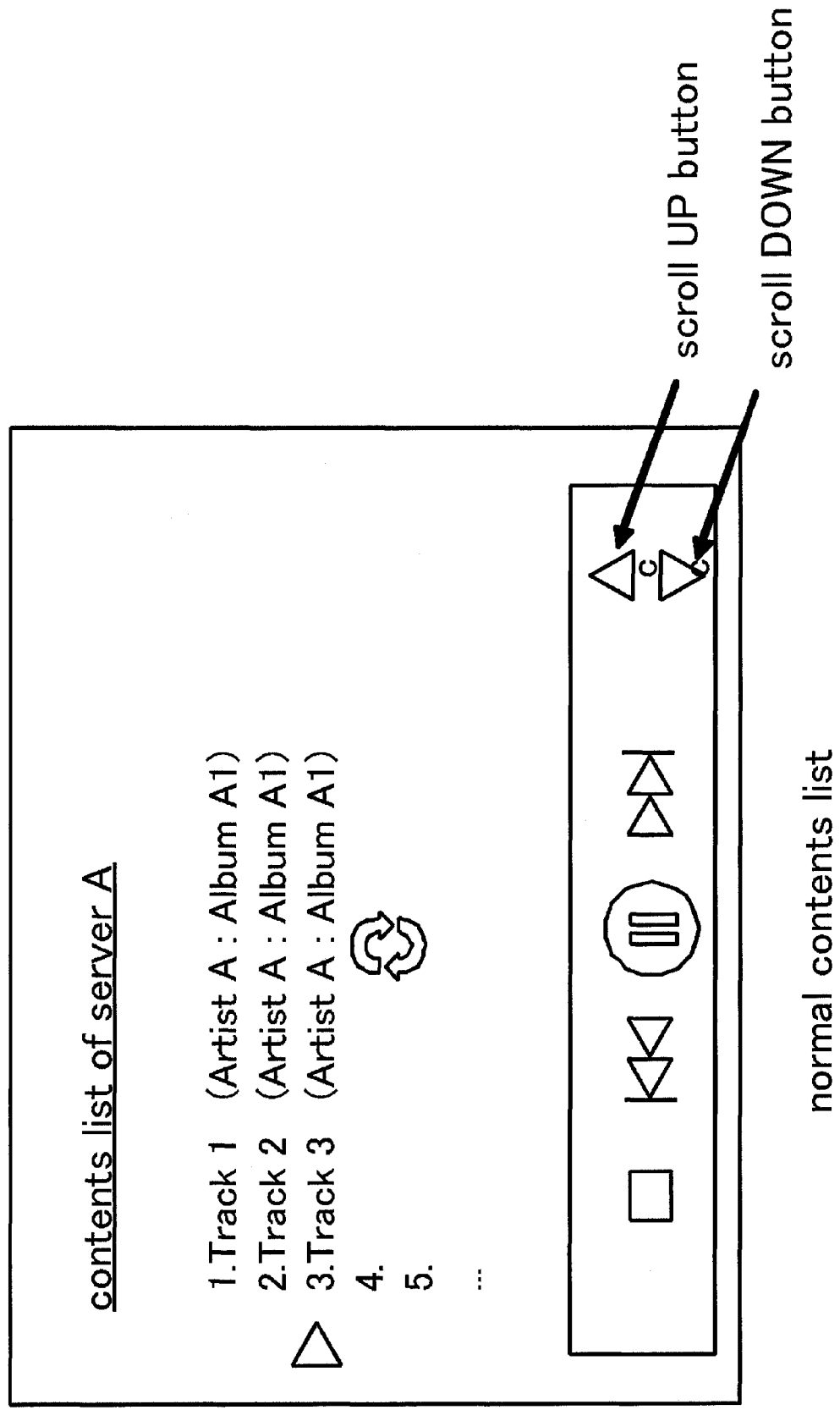
FIG. 4 illustrates a display example of a controller.

FIG. 4 illustrates the normal contents list displayed on the display section 13 of the controller 100. In FIG. 4, the normal contents list shows contents information with the serial numbers 1 to 3, and that contents information with the serial numbers after 4 and thereafter is being obtained and Track 3 is being reproduced. Contents may be reproduced by the controller 100 or by the AV receiver 200 according to an instruction of the controller 100. A scroll UP button and a scroll DOWN button are provided in lower right part of the display section 13, and an instruction of scroll up or scroll down is input by a user's operation. The control section 11 of the controller 100 obtains contents information from the AV receiver 200 in an ascending order or in a descending order of the serial numbers shown in FIG. 3 in the obtainment of the normal contents list.

Figure 5:
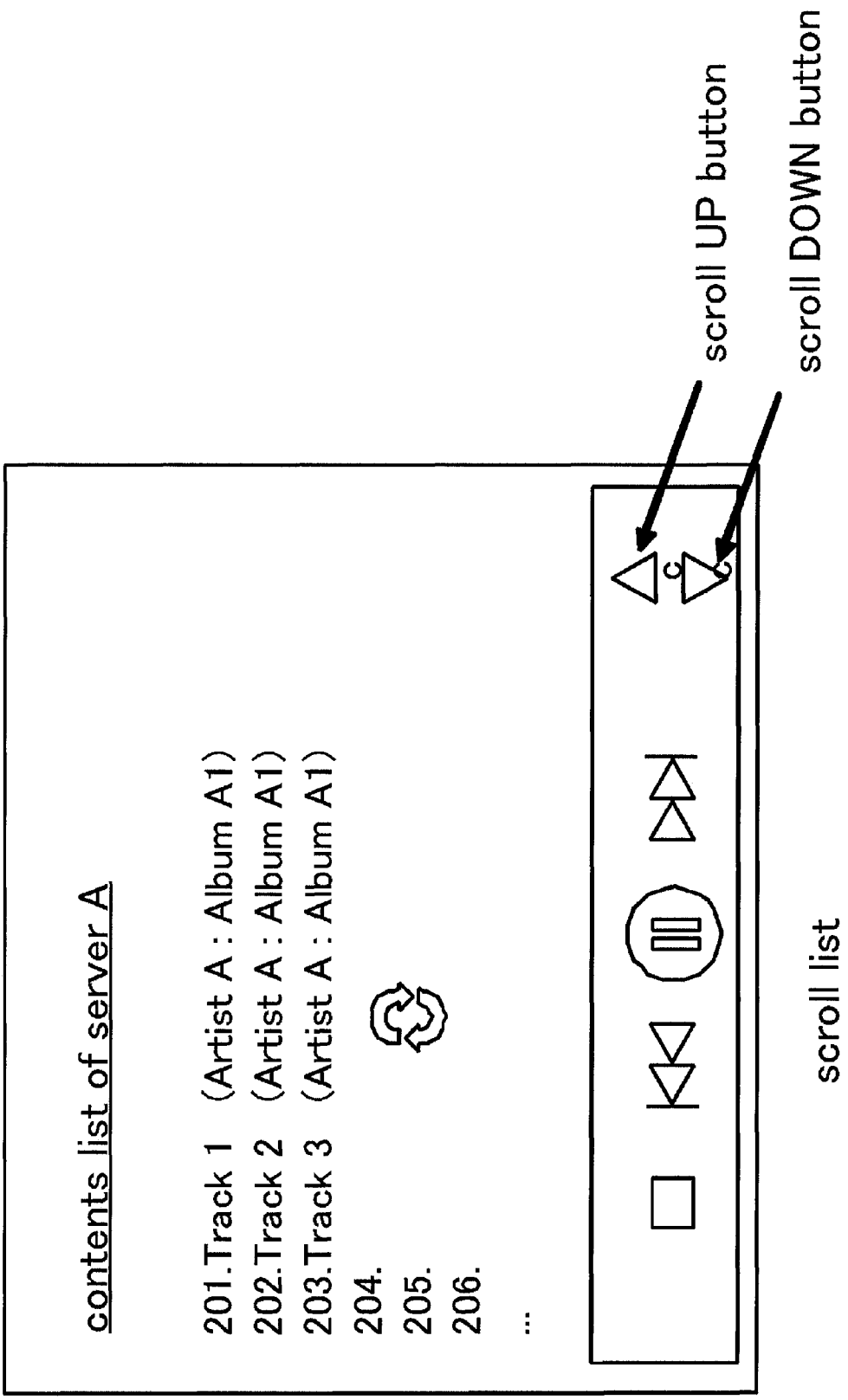
FIG. 5 is a display example of the controller.

FIG. 5 illustrates a scroll list displayed on the display section 13 of the controller 100. FIG. 5 illustrates that the scroll down instruction is input by the user's operation and scroll up to the track with the serial number 201 is carried out in the normal contents list in FIG. 4. FIG. 5 illustrates that contents information of up to the serial number 203 is finished being obtained, and that contents information with the serial numbers 204 and thereafter is being obtained. When the scroll instruction is input by the user's operation, the control section 11 of the controller 100 obtains contents information of scroll destination and displays it on the display section 13.

Figure 6:
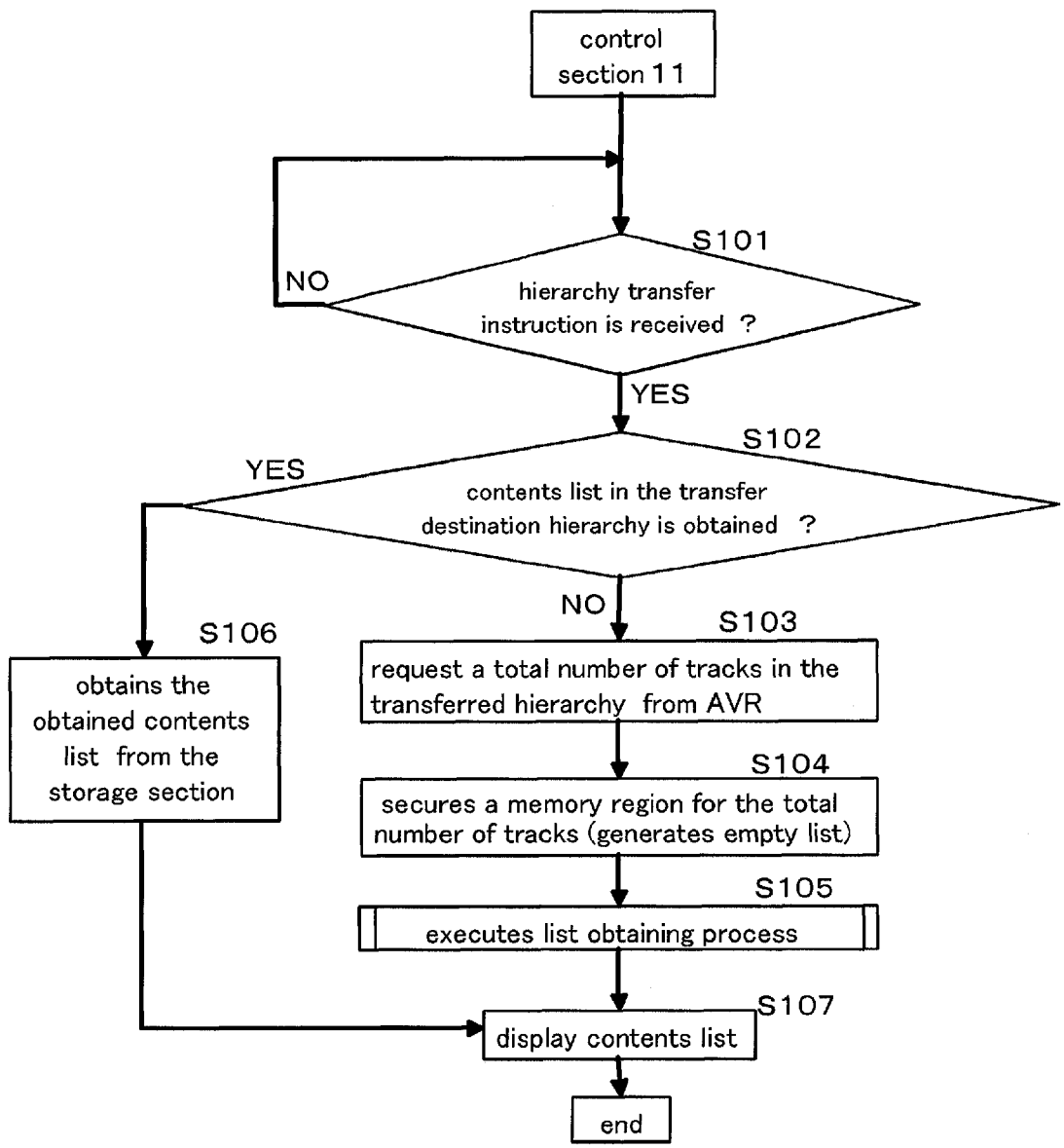
FIG. 6 is a flowchart to be executed by a control section of the controller.

FIG. 6 is a flowchart to be executed by the control section 11 of the controller 100 when transfer of a folder hierarchy is instructed by a user's operation. For example, in the case of the normal contents list in FIG. 4, the control section 11 of the controller 100 obtains contents information with the serial numbers 3 and thereafter in FIG. 6.

The control section 11 determines whether a hierarchy transfer instruction is received by a user's operation (S101). Concretely, for example, when an AllTracks folder is selected by a user's operation during display of the AllTracks folder on the display section 13 of the controller 100, the control section 11 determines that the hierarchy transfer instruction is received.

When the control section 11 determines that the hierarchy transfer instruction is not received (NO at S101), the sequence waits for input of the hierarchy transfer instruction. When the control section 11 determines that the hierarchy transfer instruction is received (YES at S101), it determines whether all the contents lists 12A in the transferred hierarchy are completely obtained (S102). For example, when the AllTracks folder is selected by the user's operation, the determination is made whether all the obtainment flags of the tracks present at the lower hierarchy of the AllTracks folder indicate TRUE. When the control section 11 determines that the contents list 12A at the transfer destination hierarchy is completely obtained (YES at S102), the control section 11 obtains the obtained contents list 12A from the storage section 12 (S106), and displays it on the display section 13 (S107).

When the control section 11 determines that a track whose contents information is not obtained is present (NO at S102), a request for obtaining a total number of tracks present in the transferred hierarchy is transmitted to the control section 21 of the AV receiver 200 (S103). For example, when the AllTracks folder is selected in a contents tree in FIG. 2, the control section 11 requests the AV receiver 200 to transmit a total number of tracks below the AllTracks folder.

The control section 11 secures a memory region for the total number transmitted from the AV receiver 200 in the storage section 12, and generates the contents list 12A (S104).

The control section 11 executes a contents list obtaining process, described later, in order to obtain information to be set in the contents list 12A (S105), and displays the contents list on the display section 13 (S107) to end the process.

Figure 7:
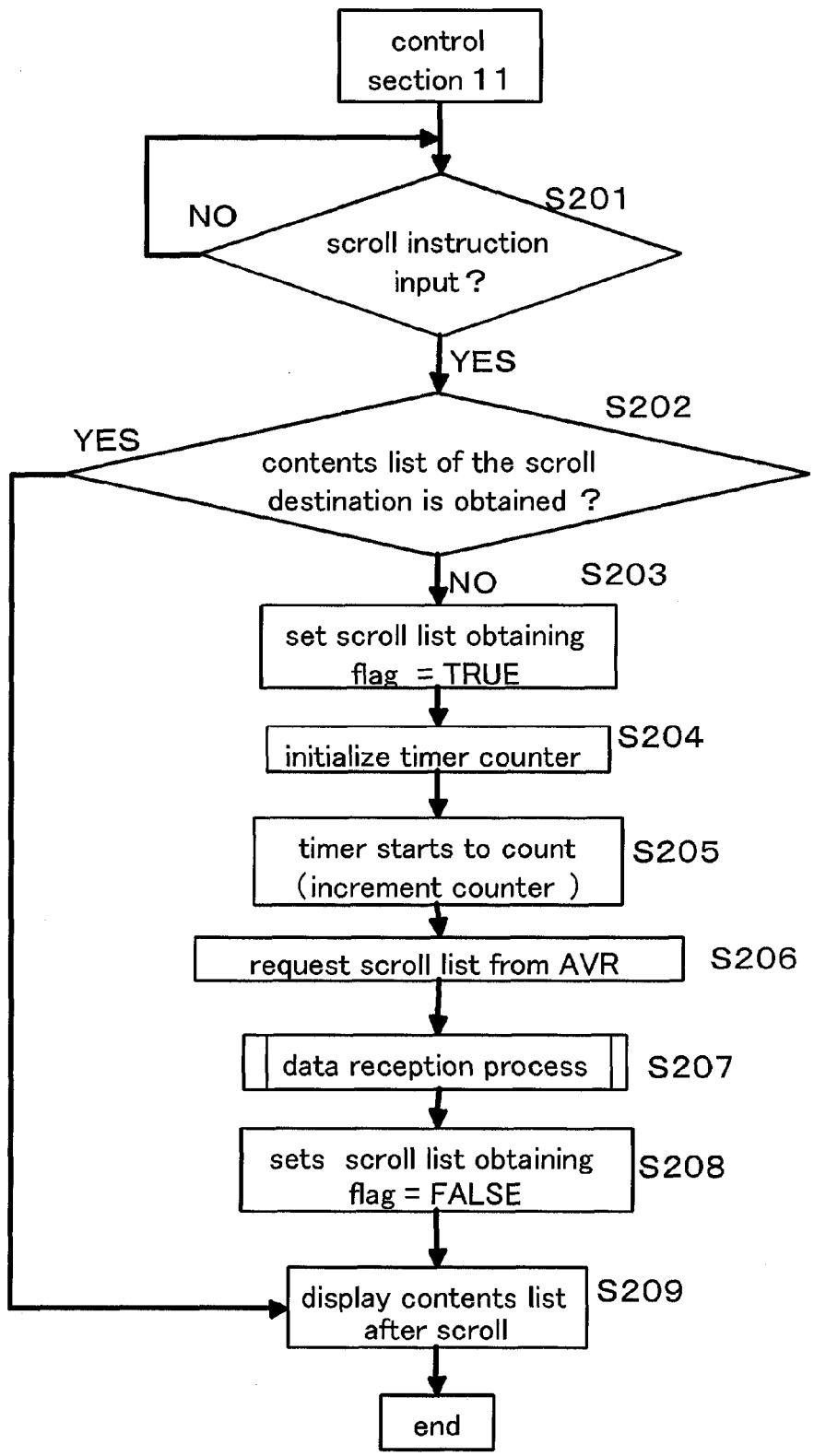
FIG. 7 is a flowchart to be executed by the control section of the controller.

FIG. 7 is a flowchart to be executed by the control section 11 when the scroll instruction is input in the controller 100 by the user's operation. For example, in a case of the scroll list in FIG. 5, the control section 11 of the controller 100 obtains contents information with the serial numbers 204 and thereafter. When the scroll instruction is input by the user's operation, the control section 11 sets a flag representing that a scroll list is being obtained, so as to prevent the request for obtaining the normal contents list from being transmitted to the AV receiver 200.

The control section 11 determines whether the instruction for scrolling the contents list is input by the user's operation (S201). When the display section 13 of a touch-panel type is traced in an up and down direction with a finger, the control section 11 carries out the scroll of the contents list.

When the control section 11 determines that the scroll instruction is not input (NO at S201), it waits for the input of the scroll instruction. When the control section 11 determines that the scroll instruction is input (YES at S201), it determines whether the contents list of scroll destination is completely obtained.

When the control section 11 determines that the contents list of the scroll destination is completely obtained (YES at S202), it displays the obtained contents list of the scroll destination (S209) so as to end the process. When the control section 11 determines that the contents list of the scroll destination is not yet obtained (NO at S202), a scroll list obtaining flag is set to TRUE (S203). The scroll list obtaining flag is a flag representing that the control section 11 is obtaining the scroll list. When the scroll list obtaining flag indicates TRUE, the control section 11 does not execute the normal contents list obtaining process.

The control section 11 initializes a timer counter variable (S204). An initial value of the timer counter variable is 0. The control section 11 starts to count the timer (S205) and increments the timer counter variable (S205). The timer increments the timer counter variable by 1 at every second, for example.

Figure 8:
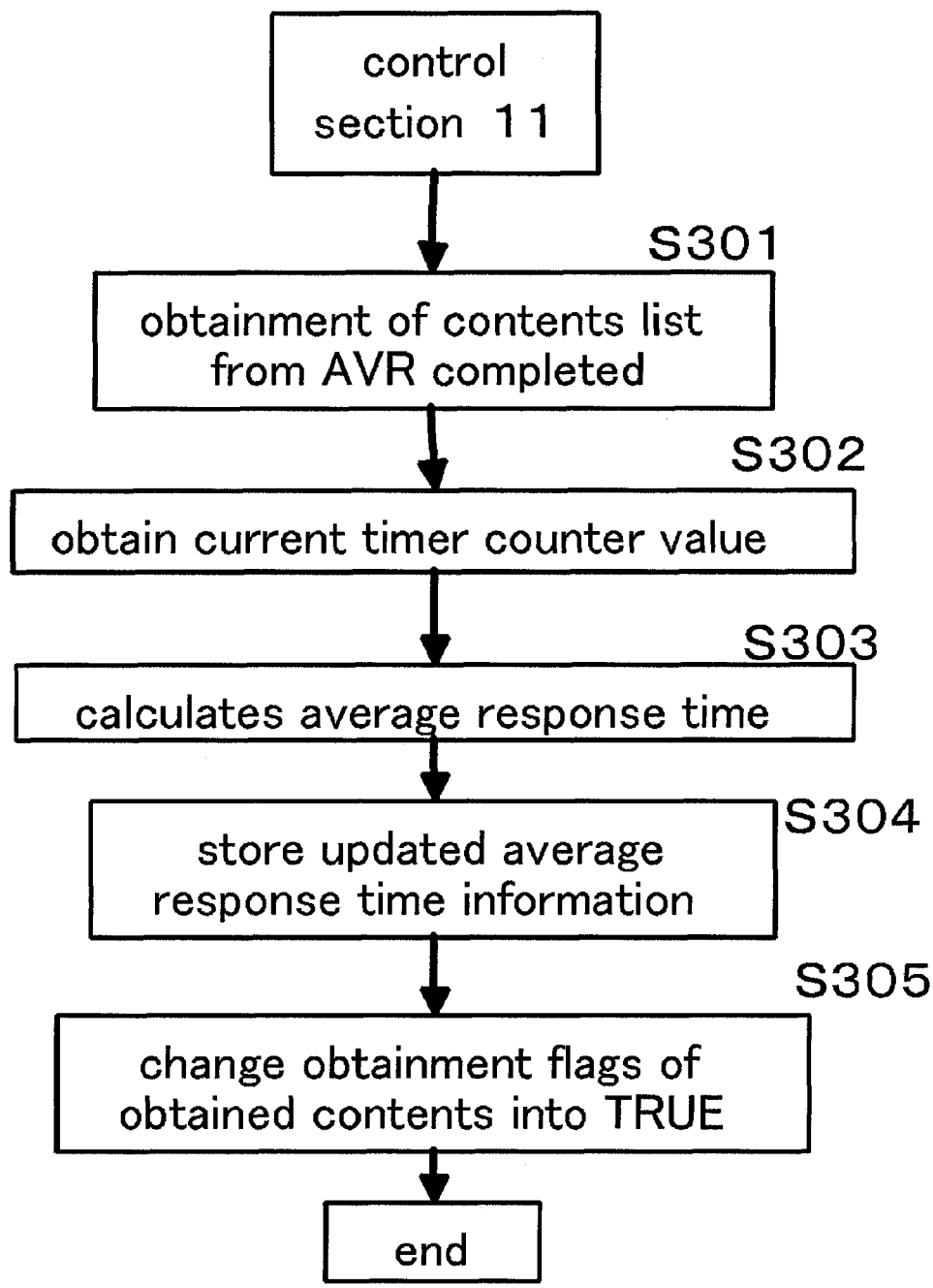
FIG. 8 is a flowchart to be executed by the control section of the controller.

The control section 11 requests the AV receiver 200 to transmit contents information about scroll destination (S206), and receives the contents information transmitted from the AV receiver 200 (S207). When the control section obtains the contents information about the scroll destination, it requests transmission of contents information about contents whose number is the same as those at a time of obtaining the normal contents list. FIG. 8 is a flowchart that the control section 11 receives contents information transmitted from the AV receiver 200 at S207. The flowchart of the reception of the contents list will be described below.

The control section 11 receives the contents information which the AV receiver 200 is requested to transmit at step S206 in FIG. 7 (S301). The control section 11 obtains a current timer counter variable (S302), and calculates average response time (S303). FIG. 9 illustrates the average response time information 12B of the storage section 12. The average response time information 12B manages the average response time, a total request frequency and total time. The average response time is a value obtained by dividing total time by the total request frequency, and an average value of the time required from the transmission of the request for obtaining the contents list from the controller 100 to the AV receiver 200 through the complete obtainment of the contents list. The total request frequency is a total frequency at which the controller 100 transmits the request for obtaining the contents list to the AV receiver 200. The total time is a total of time from the transmission of the request for obtaining the contents list from the controller 100 to the AV receiver 200 through the complete obtainment of the contents list. For example, when the timer counter variable obtained at step S302 is 2.8 seconds, the average response time is calculated at step S303 according to (total time+2.8)/(1200+1) and updated. The control section 11 uses the average response time in a process, described later.

The control section 11 updates the average response time, the total request frequency and the total time of the average response time information 12B (S304), and changes the obtainment flags of the obtained contents into TRUE (S305), and ends the process. With back to the process in FIG. 7, the control section 11 sets the scroll list on-obtaining flag to FALSE (S208), and displays the contents list on the display section 13 (S209) so as to end the process.

As a result of the above process, when the scroll instruction is input in the controller by the user's operation, since the control section 11 obtains the contents list of the scroll destination, the contents list of the scroll destination can be displayed. Further, the time required for the transmission of the request for obtaining the contents list from the controller 100 to the AV receiver 200 through the complete obtainment of the contents list is updated.

Figure 10:
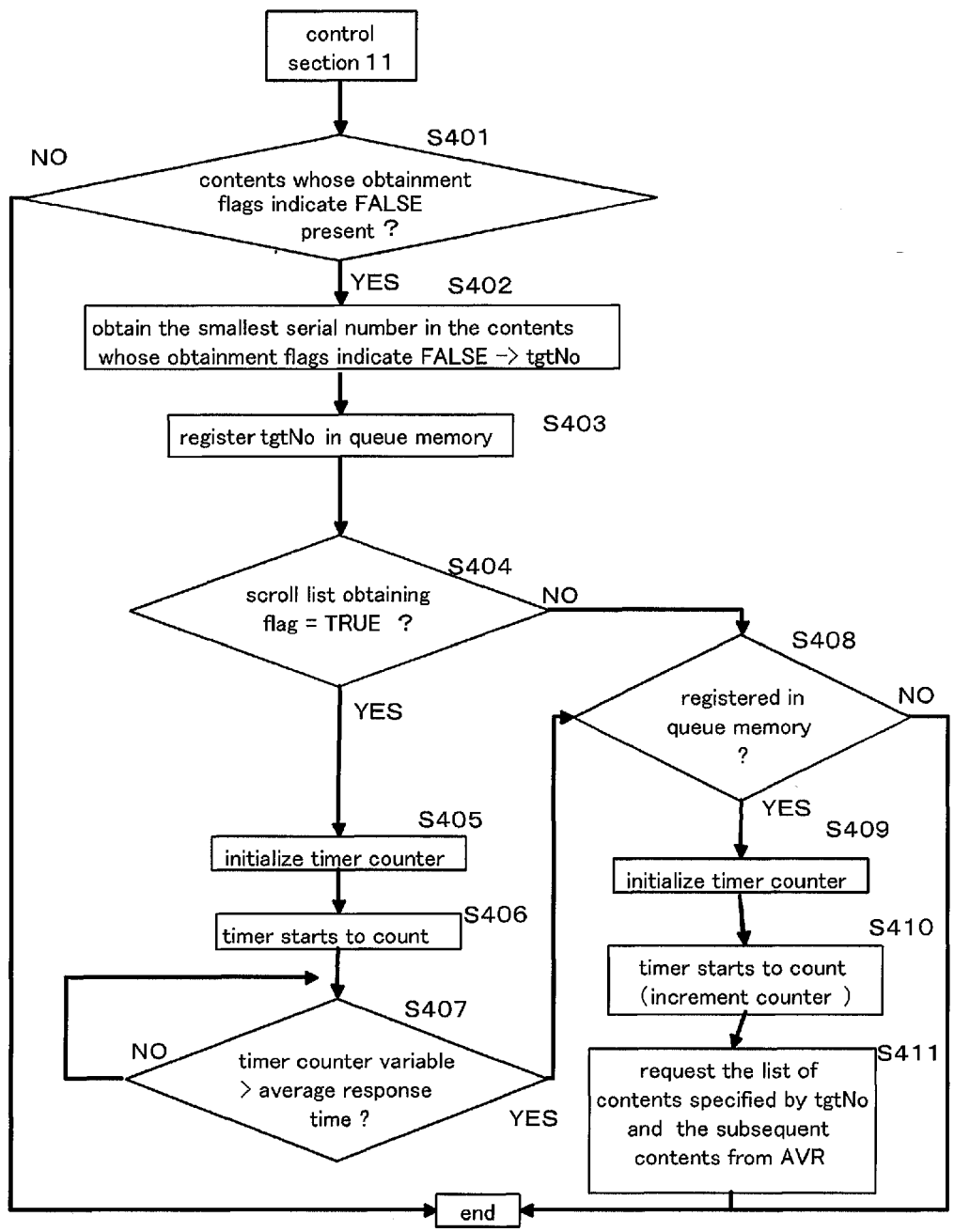
FIG. 10 is a flowchart to be executed by the control section of the controller.

FIG. 10 is a flowchart where the control section 11 of the controller 100 obtains the normal contents list. This flowchart illustrates the process at S105 in FIG. 6. In this embodiment, when the scroll list on-obtaining flag indicates TRUE, the control section 11 does not request the normal contents list, and after the average response time passes, it transmits the request for obtaining the normal contents list to the AV receiver 200.

The control section 11 of the controller 100 determines whether the contents whose obtainment flags indicate FALSE are present in the contents list 12A (S401). When the control section 11 determines that the contents whose obtainment flags indicate FALSE are not present (NO at S401), it ends the process.

When the control section 11 determines that the contents whose obtainment flags indicate FALSE are present (YES at S401), the control section 11 specifies the content with the smallest serial number in the contents whose obtainment flags indicate FALSE in the contents list 12A (S402). The control section 11 stores the specified serial number in a variable tgtNo. For example, in the case of the contents list 12A in FIG. 3, tgtNo is 201.

The control section 11 stores tgtNo in a queue memory 12C of the storage section 12 (S403). When tgtNo is registered in the queue memory 12C, the control section 11 determines that the normal contents list of the contents specified by tgtNo and the subsequent contents is required to be obtained.

The control section 11 determines whether the scroll list on-obtaining flag indicates TRUE (S404). That is to say, the control section 11 determines whether the scroll list is being obtained. When the scroll list on-obtaining flag indicates TRUE (YES at S404), the control section 11 initializes the timer counter variable to 0 (S405), and the timer starts to count (S406). The timer periodically increments the timer counter variable.

The control section 11 determines whether the timer counter variable is larger than the average response time described in the average response time information 12B (S407). When the control section 11 determines that the timer counter variable is not more than the average response time (NO at S407), the control section 11 waits until the timer counter variable becomes larger than the average response time. When the control section 11 determines that the timer counter variable is larger than the average response time (YES at S407), the process for obtaining the normal contents list at S408 and the subsequent lists is executed.

When the control section 11 determines that the scroll list on-obtaining flag indicates FALSE (NO at S404), it determines whether tgtNo is registered in the queue memory 12C (S408). As shown at S208 in FIG. 7, the scroll list on-obtaining flag is changed into FALSE when the obtainment of the scroll list is completed. For this reason, the control section 11 completes the scroll list obtaining process, and then restarts the obtainment of the normal contents list.

When the control section 11 determines that tgtNo is registered in the queue memory 12C (YES at S408), it initializes the timer counter variable to 0 (S409), and the timer starts to count (S410). The control section 11 requests the AV receiver 200 to transmit contents information about contents specified by tgtNo and the subsequent contents (S411). When the control section 11 determines that tgtNo is not registered (NO at S408), it ends the process. When the control section 11 requests the AV receiver 200 to transmit contents information in the scroll list or the normal contents list, it specifies the number of contents information to be transmitted by the AV receiver 200. A number of contents to be specified is, for example, 30, and in this case, the AV receiver 200 transmits contents information about contents from tgtNo to (tgtNo+30).

In this embodiment, when the control section 11 is obtaining the scroll list, it does not obtain the normal contents list but waits for the average response time. That is to say, the controller does not transmit the request for obtaining the normal contents list to the server until the average response time passes. As a result, since the server may execute only the process for transmitting the scroll list to the controller 100, a load on the server is small, and time until the scroll list is transmitted to the controller becomes short.

Figure 11:
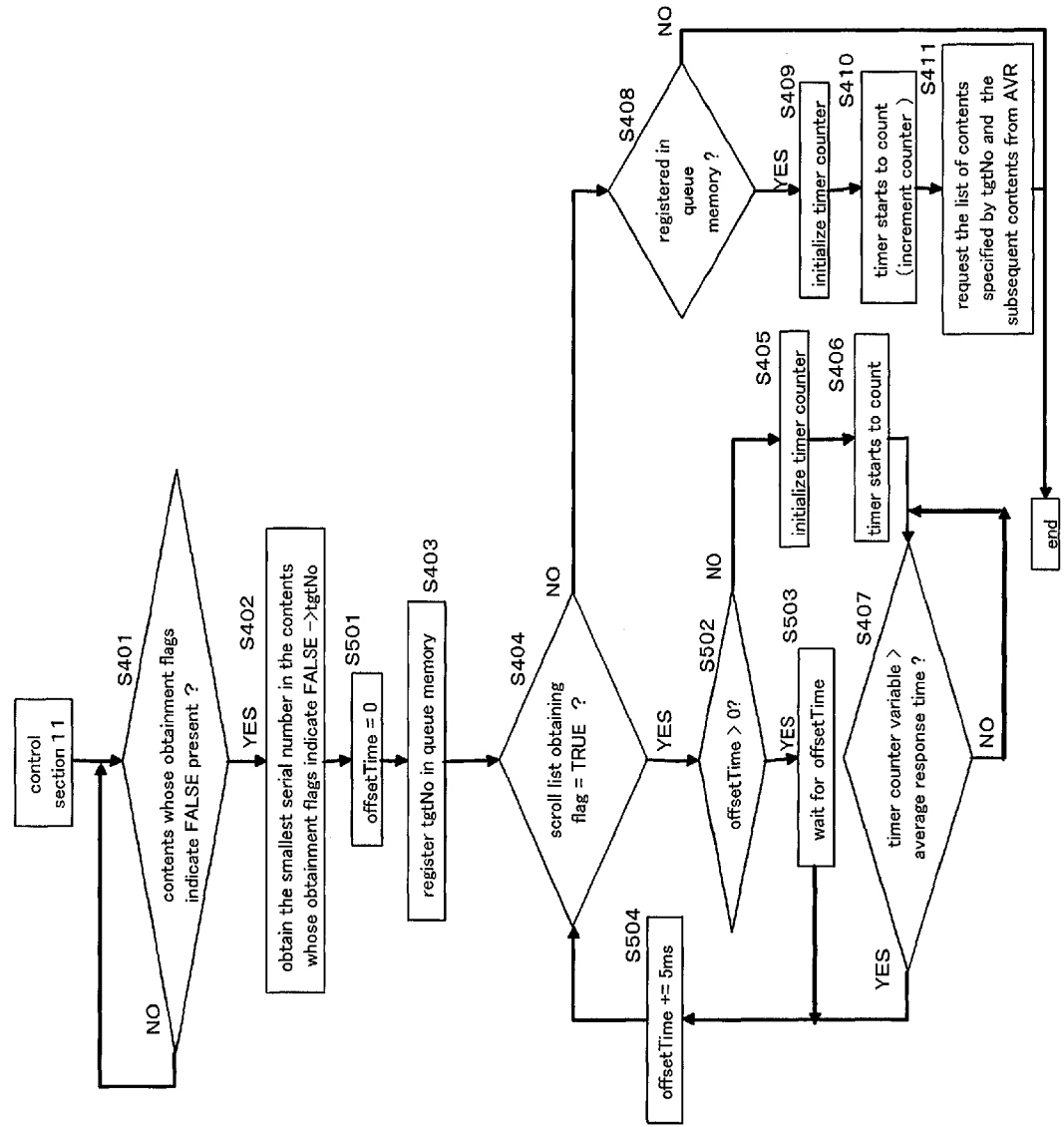
FIG. 11 is a flowchart to be executed by the control section of the controller.

FIG. 11 is a flowchart according to a second embodiment. In the second embodiment, the control section 11 does not transmit the request for obtaining the normal contents list to the AV receiver 200 while the scroll list on-obtaining flag indicates TRUE. The steps that are the same as those in FIG. 10 are denoted by the same reference numerals, and the description thereof is omitted.

The control section 11 of the controller 100 stores the smallest serial number in the contents whose obtainment flags indicate FALSE in tgtNo (S402), and initializes variable offsetTime to 0 (S501). The variable offsetTime is a variable indicating an interval of a check whether the control section 11 is obtaining the scroll list.

When the control section 11 determines that the scroll list obtaining flag indicates TRUE (YES at S404), it determines whether the offsetTime is larger than 0 (S502). Since the offsetTime is 0 at the first time, the determination is made that the offsetTime is 0 or less (NO at S502), and the timer counter variable is initialized (S405), and the timer starts to count (S406). When the control section 11 determines that the timer counter variable is larger than the average response time (YES at S407), 5 ms is added to the offsetTime (S504). The value to be added does not have to be always 5 ms.

The control section 11 again determines whether the scroll list obtaining flag indicates TRUE (S404), and when TRUE (YES at S404), it determines whether the offsetTime is larger than 0 (S502). Since 5 msec is added to the offsetTime by step S504, the control section 11 determines that the offsetTime is larger than 0 (YES at S502). The control section 11 waits for the offsetTime and executes the step at S504 and the subsequent steps. Since the offsetTime is increased by step S504 every time when the steps S404 to S503 are repeated, the control section 11 can lengthen the interval at which the check process at S404 is executed. The control section 11 may execute the process for adding the offsetTime only at first time, and may execute the determining process at S404 every constant time (for example, every 5 msec). When the control section 11 determines that the scroll list obtaining flag is set to FALSE (NO at S404), it executes the process for obtaining the normal contents list according to step S408 and the subsequent steps.

In the second embodiment, the control section 11 does not obtain the normal contents list until the obtainment of the scroll list is completed. Since the normal contents list obtaining process is not transmitted to the AV receiver 200 during the obtainment of the scroll list, the scroll list obtaining process is given priority.

Figure 12:
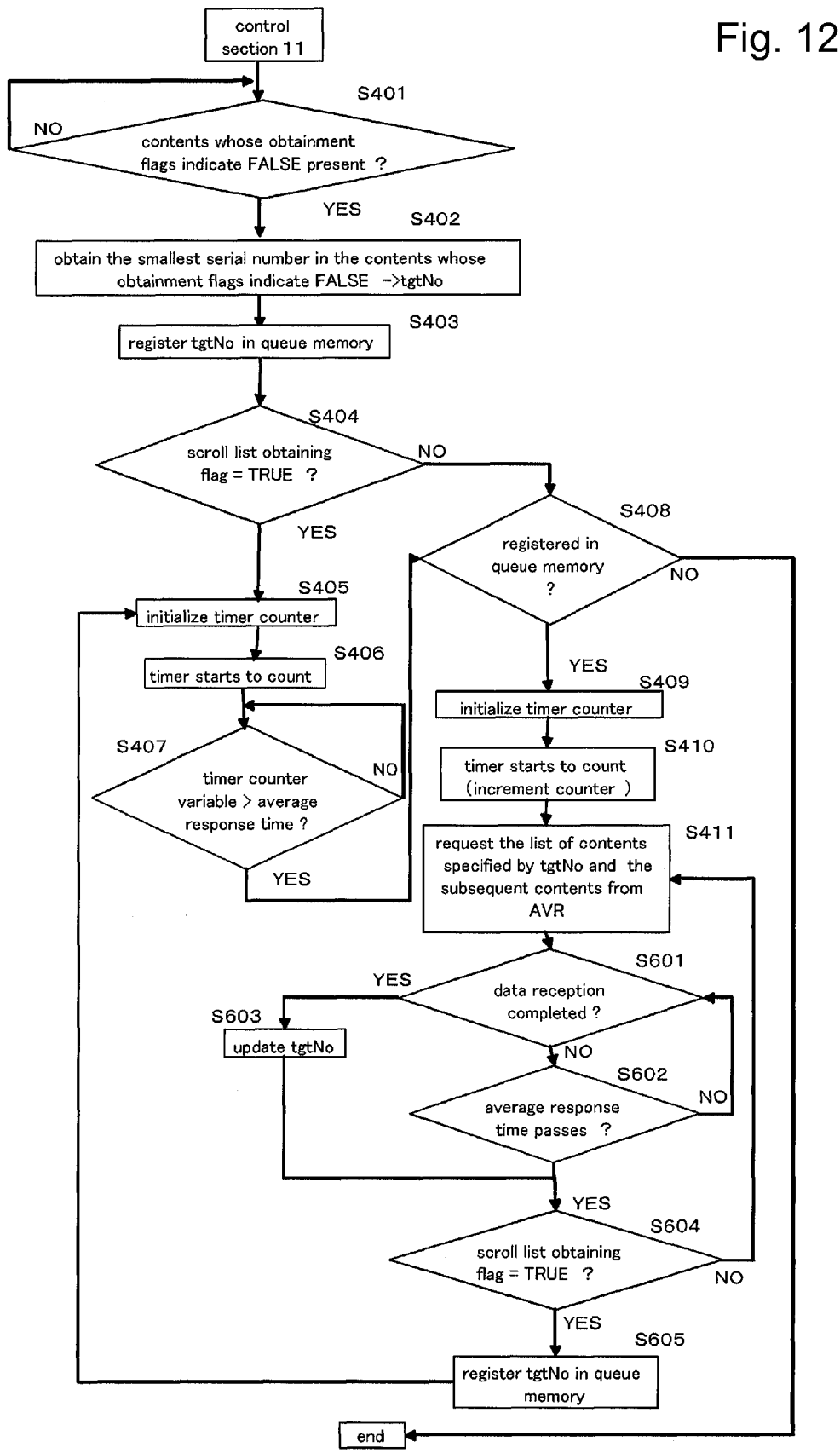
FIG. 12 is a flowchart to be executed by the control section of the controller.

FIG. 12 is a flowchart according to a third embodiment. In the third embodiment, when the control section 11 cannot obtain the normal contents information from the AV receiver 200 within the average response time, it checks whether the scroll list obtaining flag is changed into TRUE. When the scroll list obtaining flag is changed into TRUE, the control section 11 suspends the obtainment of the normal contents list, and requests the obtainment of a scroll list. The steps that are the same as those in FIG. 10 are denoted by the same reference numerals, and the description thereof is omitted.

The control section 11 transmits the request for obtaining contents information about a content specified by tgtNo and the subsequent contents to the AV receiver 200 (S411). The control section 11 determines whether the reception of the contents information is completed (S701), and when it determines that the reception of the contents information is completed (YES at S601), it updates tgtNo (S703).

When the control section 11 determines that the obtainment of the contents information is not completed (NO at S601), it determines whether the average response time passes after the timer started counting at step S410 (S602). When the control section 11 determines that the average response time does not pass (NO at S602), it again determines whether the obtainment of the contents information is completed at S601. When the control section 11 determines that the average response time passes (YES at S602), it determines whether the scroll list obtaining flag is changed into TRUE (S604). When the control section 11 determines that the scroll list obtaining flag is changed into TRUE (YES at S604), it registers tgtNo in the queue memory 12C (S605), and requests the obtainment of a scroll list at the steps after S405. When the control section 11 determines that the scroll list obtaining flag is not changed into TRUE (NO at S604), the obtainment of the normal contents list continues (S411).

In the third embodiment, when the control section 11 cannot complete the obtainment of the normal contents list within the average response time, it suspends the obtainment of the normal contents list, and obtains the scroll list. As a result, even during the obtainment of the normal contents list, the control section 11 transmits the request for obtaining the scroll list to the AV receiver 200. For this reason, the obtainment of the scroll list can be prevented from being delayed.

Figure 13:
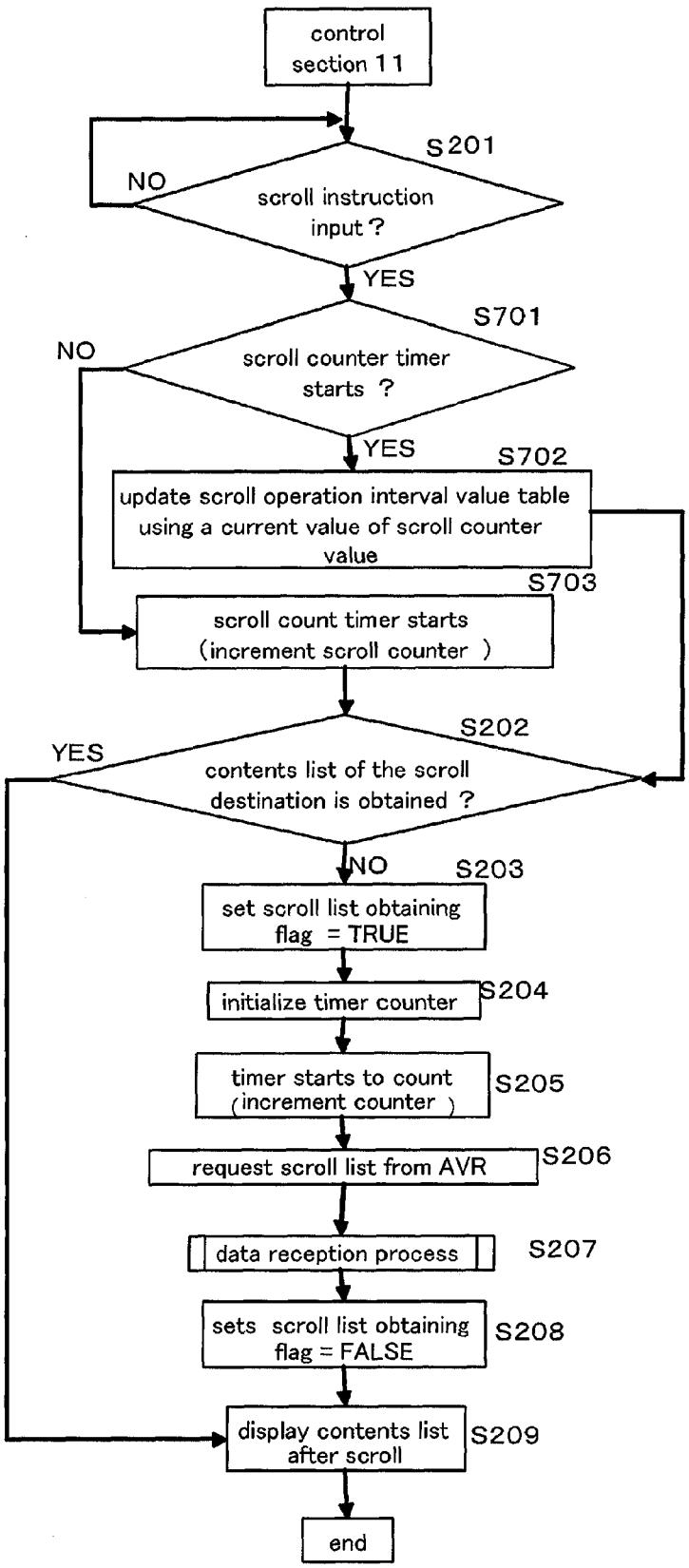
FIG. 13 is a flowchart to be executed by the control section of the controller.
Figure 15:
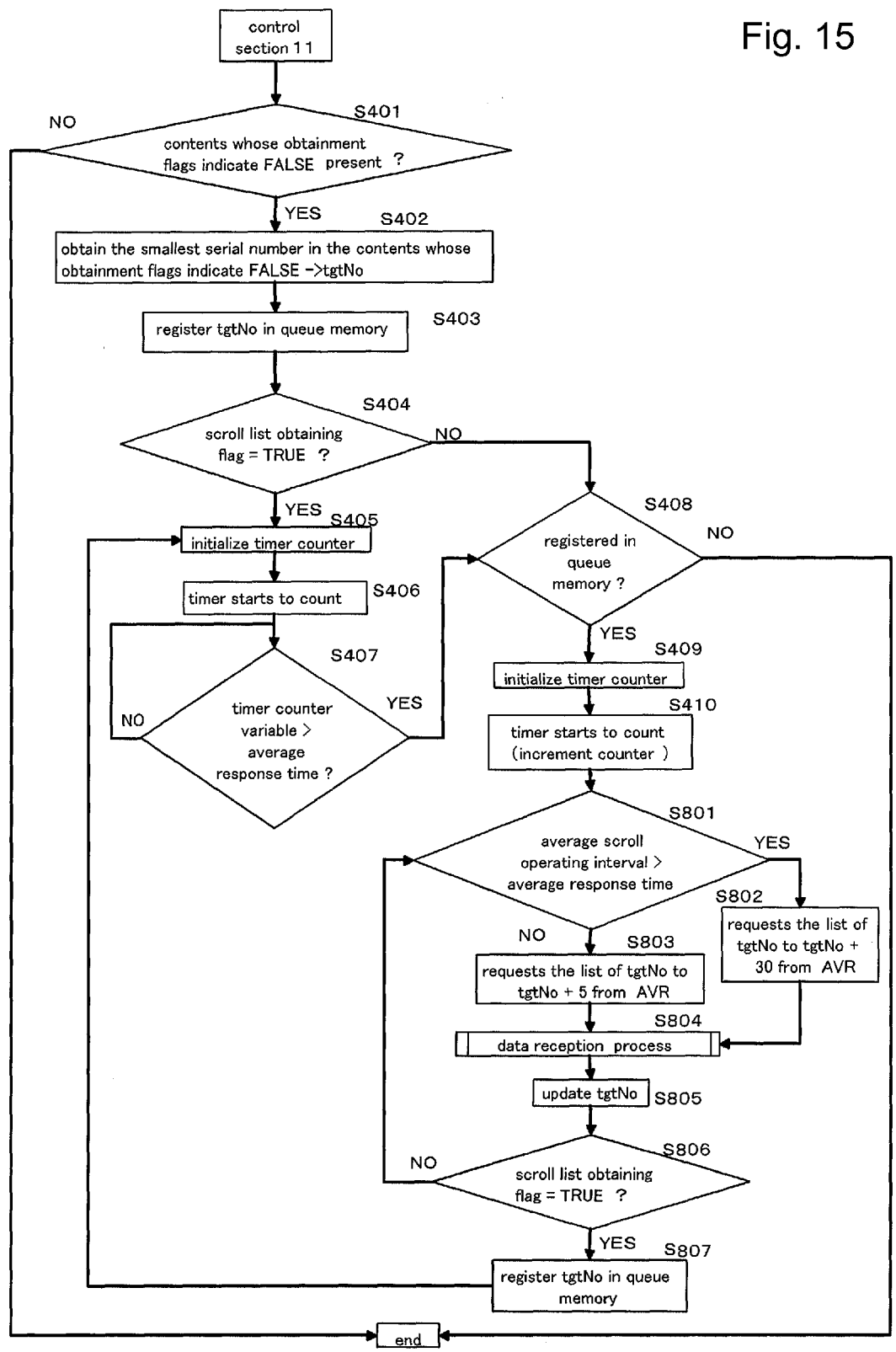
FIG. 15 is a flowchart to be executed by the control section of the controller.

FIG. 13 and FIG. 15 are flowcharts in a fourth embodiment. FIG. 13 is the flowchart of the obtainment of a scroll list in the fourth embodiment. The steps that are the same as those in FIG. 7 are denoted by the same reference numerals, and the description thereof is omitted. The control section 11 obtains an average scroll operating interval as an interval at which the scroll instruction is input by the user's operation. When the average scroll operating interval is the average response time or less, the control section 11 sets the number of contents requested from the AV receiver 200 to a small value, and completes the normal contents list obtaining process within time shorter than the average scroll operating interval so as to go to the scroll list obtaining process.

When the control section 11 determines that the scroll operation is input by the user's operation (YES at S201), it determines whether a scroll count timer already starts (S701). The scroll counter timer is a timer that increments the scroll counter variable at a constant interval. The scroll counter variable is a variable indicating the interval at which the scroll instruction is input by the user's operation. The scroll count timer starts when the controller 100 is powered on and the scroll instruction is first input.

When the control section 11 determines that the scroll count timer does not start (NO at S701), the scroll count timer starts (S703), and the scroll counter variable is incremented at every one second. When the control section determines that the scroll count timer already starts (YES at S701), it updates the scroll operation interval value table 12D using a current value of the scroll counter variable.

FIG. 14 illustrates the scroll operation interval value table 12D. The scroll operation interval value table 12D manages the average scroll operating interval, total operating frequency and total time. The average scroll operating interval represents an average of intervals at which the scroll instruction is input by the user's operation. The total operating frequency represents total frequency at which the scroll instruction is input by the user's operation. The total time represents elapsed time from the powering-on of the controller 100 and the first input of the scroll instruction. The scroll counter value is initialized to 0 every time when the power is off.

When the scroll operation is input, the control section 11 updates the average scroll operating frequency according to total time/(the total operating frequency+1) (S702).

The control section 11 can obtain the average value of the intervals at which the scroll instruction is input by the user's operation according to the process in the flowchart of FIG. 13. The control section 11 may reset the total operating frequency and the total time to 0 at every several minutes or several seconds, and may maintain the nearest average scroll operating interval.

FIG. 15 illustrates the normal contents list obtaining process in the fourth embodiment. The steps that are the same as those in FIG. 10 are denoted by the same reference numerals, and the description thereof is omitted.

When the control section 11 determines that tgtNo is registered in the queue memory 12C (YES at S408), it initializes the timer counter variable (S409), and starts the counting of the timer (S410).

The control section 11 determines whether the average scroll operating interval is larger than the average response time (S801). When the determination is made that the average scroll operating interval is larger than the average response time (YES at S801), the determination is made that the scroll operation is not input during the obtainment of the normal contents list. For this reason, the control section 11 requests the obtainment of contents information from tgtNo to tgtNo+30 (S802).

When the control section 11 determines that the average scroll operating interval is the average response time or less (NO at S801), the determination is made that the scroll operation is input during the obtainment of the normal contents list. For this reason, the normal contents list obtaining process should be ended by the AV receiver 200 for short time. Therefore, the control section 11 transmits the request for obtaining the contents information of tgtNo to (tgtNo+5) to the AV receiver 200 (S803). The value does not have to be always up to tgtNo+5, and any value such that contents information can be obtained from the AV receiver 200 within any short time may be used. Further, the control section 11 obtains the number of contents in the normal contents list that can be completely obtained for shorter time than the average scroll operating interval in advance, and gives the obtaining request to the AV receiver 200.

The control section 11 executes the data receiving process shown in FIG. 8 (S804), and updates tgtNo to a value indicated by tgtNo+5 (S805). The control section determines whether the scroll list obtaining flag is changed into TRUE (S806). When the flag is changed into TRUE (YES at S806), updated tgtNo is registered in the queue memory 12C (S807), and the scroll list is obtained by the steps after S405. When the control section 11 determines that the scroll list obtaining flag is not changed into TRUE (NO at S806), it continues obtaining the normal contents list (S801).

In the fourth embodiment, when the average scroll operating interval is the average response time or less, the control section 11 sets the number of contents requested from the AV receiver 200 to a small number, and completes the normal contents list obtaining process within shorter time than the average scroll operating interval, and goes to the scroll list obtaining process. As a result, the obtainment of the scroll list can be prevented from being delayed.

Figure 16:
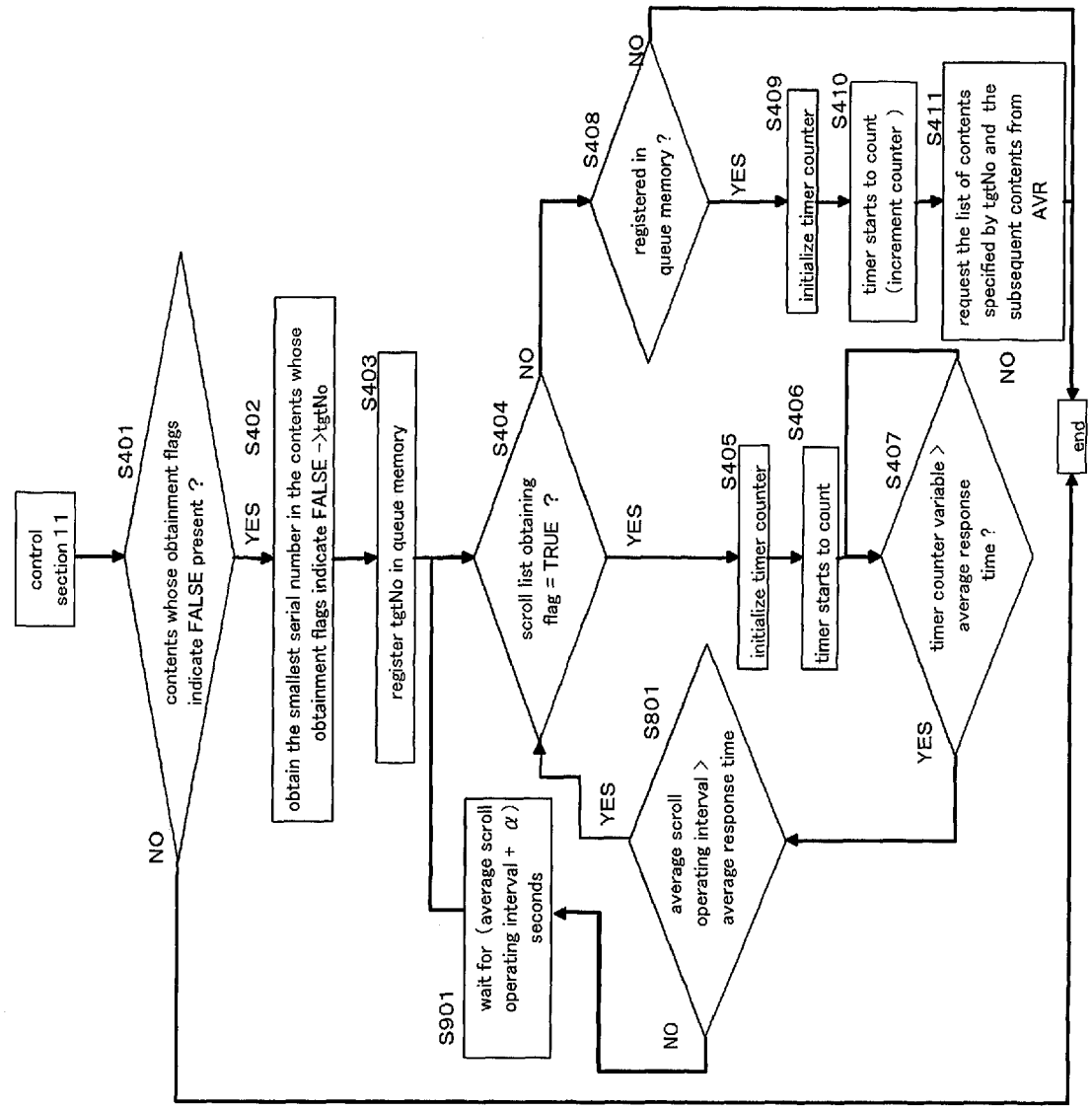
FIG. 16 is a flowchart to be executed by the control section of the controller.

FIG. 16 is a flowchart illustrating the process for obtaining a normal contents list according to a fifth embodiment. The steps that are the same as those in FIG. 10 or 15 are denoted by the same reference numerals, and the description thereof is omitted.

When the control section 11 determines that the timer counter variable value is larger than the average response time (YES at S407), it determines whether the average scroll operating interval in FIG. 14 is larger than the average response time (S801). When the control section 11 determines that the average scroll operating interval is larger than the average response time (YES at S801), it determines whether the scroll list obtaining flag is changed into TRUE (S404), and executes the steps after S405 or S408. When the determination is made that the average scroll operating interval is larger than the average response time, the control section 11 can obtain the normal contents list from the AV receiver 200 according to the steps after S408 until the scroll instruction is input by the user's operation. For this reason, the control section 11 obtains the normal contents list.

When the control section 11 determines that the average scroll operating interval is the average response time or less (NO at S801), it stands by for (the average scroll operating interval+α) seconds (S901), and determines whether the scroll list obtaining flag is set to TRUE (S404). α is any time such as 3 seconds. α may be 0. That is to say, when the average scroll operating interval is the average response time or less, the scroll operation is likely to be input during the obtainment of the normal contents list. For this reason, the normal contents list obtaining process is not executed, and the control section 11 waits for the input of the scroll operation.

In the fifth embodiment, in a case where the scroll operation is expected to be instructed during the obtainment of the normal contents list even when tgtNo is registered in the queue memory, the control section 11 does not execute the normal contents list obtaining process, and waits for the input of the scroll instruction. For this reason, the time until the scroll list is displayed can be shortened.

The preferred embodiments of the present invention are described above, but the present invention is not limited to these embodiments. The controller 100 may request the server 300 to transmit the contents list.

The present invention can be suitably employed on devices such as controllers.

What is claimed is:

1. A controller comprising:
a communications interface for communicating with a transmitting apparatus for transmitting a contents list; and
a control processor configured to execute a controller program stored on a non-transitory computer readable medium to perform the steps of:
determining whether obtainment of contents information in the contents list is finished;
transmitting a normal contents list obtaining request that is a request for obtaining a predetermined number of the contents information of the contents whose contents information in the contents list is determined that the obtainment is not finished to the contents list transmitting apparatus so as to obtain the contents information;
storing an average response time as an average value of time from transmission of the normal contents list obtaining request to the contents list transmitting apparatus through completion of reception of the contents information;
receiving a scroll instruction of the contents list is input by a user's operation into a scroll operation input section,
when the scroll instruction is input, determining whether the obtainment of the contents information in the contents list of scroll destination is completed and determining that the information is not completely obtained, setting the contents information about the scroll destination into an on-obtaining state; and
determining whether the scroll list is being obtained, wherein
when the determination is made that the scroll list is being obtained, the normal contents list obtaining request is not transmitted, and the request for obtaining the contents information about the scroll destination is transmitted to the contents list transmitting apparatus, and
after the request for obtaining the contents information about the scroll destination is transmitted to the contents list transmitting apparatus, the normal contents list obtaining request is transmitted after the average response time passes.

2. The controller according to claim 1, wherein the control processor further is configured to:
after the contents information about the scroll destination is obtained set the scroll list into a non-obtaining state, and
after the scroll list is set into the non-obtaining state transmit the normal contents list obtaining request to the contents list transmitting apparatus.

3. The controller according to claim 1, wherein the control processor further is configured to:

when the average response time passes after the normal contents list obtaining request is transmitted to the contents list transmitting apparatus, determine whether the scroll list is being obtained, and
when the determination is made that the scroll list is being obtained, a process for obtaining the contents information in the normal contents list from the contents list transmitting apparatus is suspended, and the request for obtaining the contents information about the scroll destination is transmitted to the contents list transmitting apparatus.

4. The controller according to claim 1, wherein the control processor further is configured to perform the steps of:
obtaining a scroll instructing interval that is an average value of time from the input of the scroll instruction by means of the user's operation through next input of the scroll instruction,
wherein when the determination is made that the scroll instructing interval is the average response time or less, the request for obtaining the contents information in the normal contents list whose number is smaller than the predetermined number is transmitted to the contents list transmitting apparatus in the normal contents list obtaining request.

5. The controller according to claim 1, wherein the control processor further is configured to perform the steps of:
obtaining a scroll instructing interval that is an average value of time from the input of the scroll instruction by means of the user's operation through next input of the scroll instruction,
wherein when the determination is made that the scroll instructing interval is the average response time or less, the normal contents list obtaining request is not transmitted to the contents list transmitting apparatus, and the control processor waits for input of the scroll instruction until time of the scroll instructing interval or more passes.

6. A non-transitory computer medium storing a controller program executed by a control processor to perform the steps of:
communicating with a transmitting apparatus for transmitting a contents list
determining whether obtainment of contents information in the contents list is finished;
transmitting a normal contents list obtaining request that is a request for obtaining a predetermined number of the contents information of the contents whose contents information in the contents list is determined that the obtainment is not finished to the contents list transmitting apparatus so as to obtain the contents information;
storing an average response time as an average value of time from transmission of the normal contents list obtaining request to the contents list transmitting apparatus through completion of reception of the contents information;
receiving a scroll instruction of the contents list is input by a user's operation into a scroll operation input section,
determining whether the obtainment of the contents information in the contents list of scroll destination is completed and determining that the information is not completely obtained, setting the contents information about the scroll destination into an on-obtaining state; and
determining whether the scroll list is being obtained, wherein
when the determination is made that the scroll list is being obtained, the normal contents list obtaining request is not transmitted, and the request for obtaining the contents information about the scroll destination is transmitted to the contents list transmitting apparatus, and
after the request for obtaining the contents information about the scroll destination is transmitted to the contents list transmitting apparatus, the normal contents list obtaining request is transmitted after the average response time passes.

\* \* \* \* \*